US007023899B2

(12) United States Patent
Das et al.

(10) Patent No.: US 7,023,899 B2
(45) Date of Patent: Apr. 4, 2006

(54) METHOD FOR RELIABLE SIGNALING INFORMATION TRANSMISSION IN A WIRELESS COMMUNICATION SYSTEM

(75) Inventors: Arnab Das, Old Bridge, NJ (US); Nandu Gopalakrishnan, Chatham, NJ (US); Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 846 days.

(21) Appl. No.: 09/853,000

(22) Filed: May 10, 2001

(65) Prior Publication Data

US 2002/0167992 A1    Nov. 14, 2002

(51) Int. Cl.
H04B 1/707    (2006.01)
H04B 7/216    (2006.01)
(52) U.S. Cl. ............... 375/146; 375/295; 370/342
(58) Field of Classification Search ........... 375/146, 375/141, 295; 370/320, 324, 335, 341, 342, 370/385, 441; 398/78; 455/515; 714/701, 714/746, 799
See application file for complete search history.

(56) References Cited

U.S. PATENT DOCUMENTS

| | | | | |
|---|---|---|---|---|
| 5,119,397 A | | 6/1992 | Dahlin et al. ............... 375/5 |
| 5,325,394 A | * | 6/1994 | Bruckert ................ 375/148 |
| 5,850,394 A | * | 12/1998 | Sekine et al. ............ 370/342 |
| 5,970,058 A | * | 10/1999 | DeClerk et al. .......... 370/331 |
| 6,377,559 B1 | * | 4/2002 | Haardt .................. 370/326 |
| 6,560,292 B1 | * | 5/2003 | Lundby et al. .......... 375/259 |
| 6,661,833 B1 | * | 12/2003 | Black et al. ............. 375/147 |
| 6,725,043 B1 | * | 4/2004 | Bonta et al. ............ 455/437 |
| 6,760,587 B1 | * | 7/2004 | Holtzman et al. ........ 455/436 |
| 6,799,039 B1 | * | 9/2004 | Wu et al. ................ 455/436 |

FOREIGN PATENT DOCUMENTS

WO    WO 01/35563 A1    5/2001

OTHER PUBLICATIONS

Zellulare Mobilfunknetze, IND/RWTH Aachen, 1999, pp. 1-9.*
European Search Report.

* cited by examiner

*Primary Examiner*—Betsy L. Deppe

(57) ABSTRACT

A method for reliably transmitting signaling information is provided. One type of signaling information is transmitted over a primary control channel. The signaling information that is to be transmitted over the primary control channel is defined as a set of particular information. Other signaling information are conveyed over a secondary control channel. Prior to transmission, the information to be conveyed over the secondary channel is scrambled in accordance with a particular scrambling procedure that indicates the information that is to be sent over the primary control channel. The scrambling is thus used to encode the information content of the primary control channel into the information of the secondary control channel thereby further protecting the integrity of the information being conveyed over both control channels.

9 Claims, 1 Drawing Sheet

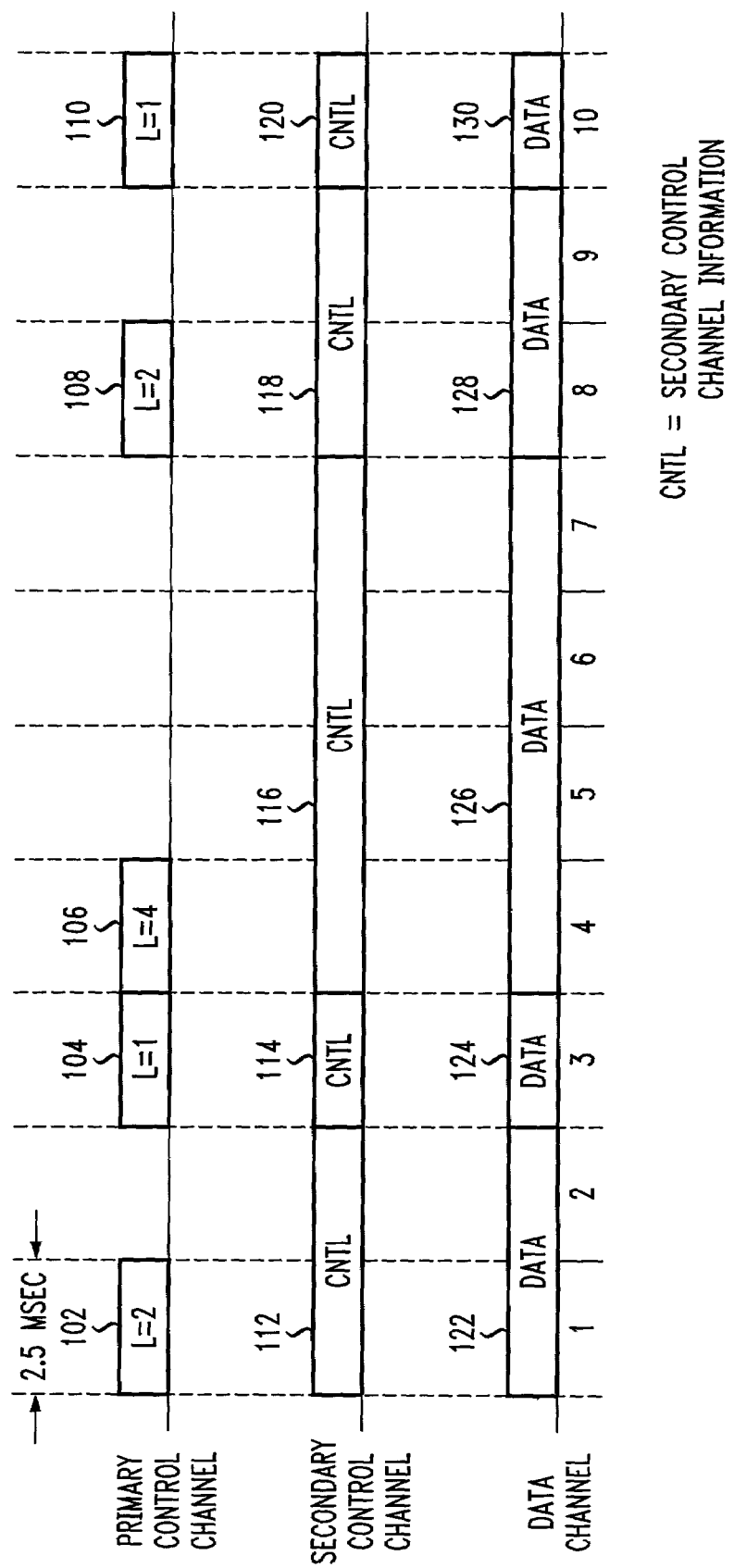

METHOD FOR RELIABLE SIGNALING INFORMATION TRANSMISSION IN A WIRELESS COMMUNICATION SYSTEM

BACKGROUND OF THE INVENTION

1. Field of the Invention

The present invention is generally related to communication systems and in particular to reliable transmission of signaling information in wireless communication systems.

2. Description of the Related Art

Communication systems and, in particular, wireless communication systems convey (i.e., transmit and/or receive) information in channel coded form over communication channels. The channel coding helps protect the integrity of the information being conveyed over communication channels of a communication system. In particular, the channel coding of the information is done to help detect any errors when the information is received after such information has propagated (in the form of a communication signals) over the communication channels of a system. The channel coding also serves the purpose of reducing the likelihood of errors occurring in the conveyed information where such errors are due to anomalies that exist in the communication channels. As such, the channel coding is not used only for error detection but also for error correction.

In a typical communication system, the information being conveyed between users of such systems, i.e., user information, is processed in accordance with various rules and protocols that are part of a standard typically established by a communication standards body. The user information is typically conveyed over data or traffic channels. In addition to user information, signaling information is conveyed between users and between equipment of the communication system to implement the particular protocol with which the communication system complies. Signaling information, which is conveyed over signaling or control channels, is generated by various equipment (user and/or system) of the communication system. The signaling information provides the rules by which user information is processed, transmitted and received by various equipment of the communication system. The signaling information represents and executes the protocol of the communication system.

Many communication systems comply with standards that require the use of more than one control channel per data channel. For example, in Code Division Multiple Access (CDMA) communication systems that comply with the cdma2000-1x-EV-DV standard, there are two control channels per data channel. The control channels associated with a data channel carry signaling information that dictate how the user information is transmitted over the data channel and how the user information is processed after having propagated through the data channel. The first control channel, which is called the primary control channel, contains timing information for the user information. The second control channel, which is called the secondary control channel, contains various information that describe the format and the identification of the user information being transmitted over the data channel.

In CDMA systems complying with the cdma2000-1x-EV-DV standard, information in both control and data channels are transmitted in the form of sub-packets during one or more time slots. The cdma2000-1x-EV-DV standard has defined a time slot to be 1.25 milliseconds in duration. At the transmit end, a block of user information—usually a group of bits—is coded and the resulting coded block of user information, which is called a packet, is divided into several sub-packets. The channel coding of the user information is done such that the information contained in the original block of user information can be retrieved from one or a combination of any number of the sub-packets. The amount of information contained in the original block is called the payload size. The payload size is part of the information included in the secondary control channel information.

The secondary control channel information, which is transmitted in parallel and in synchronization with the user information, also contains other information. In particular, the secondary control channel information includes the MAC ID of the sub-packet which identifies a user on a shared channel. The secondary channel information further includes: (1) the Sub-packet ID which identifies a particular sub-packet being transmitted over a data channel; (2) Automatic Retransmission reQuest (ARQ) channel ID which identifies a logical ARQ channel; (3) New packet indication which identifies the first sub-packet of a group of sub-packets being transmitted or acts to demarcate one group of sub-packets from another group.

The primary control channel contains information about the particular time slot or slots to which a sub-packet in a particular data channel is assigned. The primary control channel information not only dictates the number of slots used for the data channel but also indicates the number of slots used for the secondary control channel. For example, a primary control channel contains information indicating that the secondary and data channels will be transmitted during four time slots. Consequently, the sub-packets associated with the secondary channel and data channels are transmitted during four time slots. Therefore, if the primary control channel is received with errors, the information contained in the secondary channel and the data channel will not be decoded properly. Continuing with the example above, if a receiver receives erroneous primary control channel information indicating that the secondary channel information and the data channel information are to be transmitted during three time slots, the receiver will attempt to decode only three time slots worth of secondary control channel information and three time slots worth of data channel information. In some cases, the secondary channel information may still be correctly decoded because they are repeated in each slot. However, in most cases the received information (user information and secondary control channel information) will be improperly decoded and improperly retrieved resulting in errors. Therefore, there is some uncertainty in the ability to correctly decode the secondary control channel and data channel information because of lack of reliability in the primary control channel information. In other words, the proper decoding of secondary channel information does not necessarily mean that the primary channel information was error free. Further, even if the secondary channel information is properly decoded from erroneous primary channel information, the data channel information may still be improperly decoded. The problem of erroneous signaling information is typically addressed by increasing the amount of channel coding applied to such information and to the user information.

The error detection and error correction codes added to the user and signaling information help to negate the effects of noise sources and other anomalies on the user and signaling information propagating through the data and control channels respectively. However, error correction and error detection coding typically require additional channel capacity because such coding cause more information to be conveyed in the signaling and user channels. Usually there is a direct relationship between capacity and transmission power requirements and a direct relationship between capacity and bandwidth requirements of a communication system. Service providers, which are entities that own, operate or otherwise control communication systems, thus have to bear the extra costs of additional capacity, power and bandwidth associated with the additional channel coding used for the communication channels of their communication system. In particular, the signaling channels typically require more robust channel coding than the data channels because the signaling information contain critical timing and processing information that are used to decode and retrieve the user information. User information cannot be properly decoded if associated signaling information is received in error; this is so regardless of whether the user information itself is received with or without errors. In communication systems such as cdma2000-1x-EV-DV compliant CDMA systems which have more than one signaling channel, the use of additional and more robust channel coding in the signaling channels has an even more burdensome effect on system resources such as transmission power, bandwidth requirements and capacity requirements.

What is therefore needed is a method of further protecting the integrity of signaling channel information without having to increase the amount of channel coding applied to such communication channels. In particular for cdma2000-1x-EV-DV compliant CDMA communication systems, what is further needed is a method where the errors occurring in the primary control channel can be detected and corrected without the use of additional channel coding thus allowing the received secondary control channel information and the received data channel information to be decoded correctly.

SUMMARY OF THE INVENTION

The method of the present invention provides a technique for reliable transmission of signaling channel information where such signaling information is used to properly decode user information and other signaling information. Information contained in a first signaling channel is encoded into the information contained in a second signaling channel through the use of a scrambling scheme thereby improving the integrity of the information in both control channels without having to use any additional channel coding. A particular set of signaling information for the first signaling channel is provided and each signaling information from the set is associated with a different scrambling procedure of the particular scrambling scheme being applied to the second signaling channel information. In this manner errors that occur in the first signaling channel can be detected and corrected without the use of additional channel coding, thus allowing the user information and information from the second signaling channel to be decoded correctly. Some of the preferred types of scrambling schemes comprise interleaving and the use of orthogonal Walsh codes with different spreading factors.

BRIEF DESCRIPTION OF THE DRAWINGS

FIG. 1 depicts various sub-packets being transmitted over primary, secondary and data channels of a cdma2000-1x-EV-DV standard compliant CDMA system in accordance with the method of the present invention.

DETAILED DESCRIPTION

The method of the present invention provides a technique for reliable transmission of signaling channel information where such signaling information is used to properly decode user information and other signaling information. Information contained in a first signaling channel is encoded into the information contained in a second signaling channel through the use of a scrambling scheme thereby improving the integrity of the information in both signaling channels without having to use any additional channel coding. A particular set of signaling information for the first signaling channel is provided and each signaling information from the set is associated with a different scrambling procedure of a particular scrambling scheme being applied to the second signaling channel information. In this manner errors that occur in the first signaling channel can be detected and also corrected—without having to apply additional channel coding—allowing the user information and information from the second signaling channel to be decoded correctly. Some of the preferred types of scrambling comprise interleaving and the use of orthogonal Walsh codes with different spreading factors. Channel coding is typically applied to the signaling channels and data channel to provide error detecting capability. The channel coding may also provide error correction capability. One example of a channel coding scheme used for error detecting is the well known Cyclic Redundancy Code (CRC).

Referring to FIG. 1, the method of the present invention will be described in the context of a CDMA wireless communication system in compliance with the cdma2000-1x-EV-DV standard. It should be understood that the method of the present invention is not limited to CDMA wireless communication systems that comply with the cdma2000-1x-EV-DV standard. The channel format shown in FIG. 1 is used for illustrative purposes only and that the method of the present invention is applicable to other types of communication systems that comply with other standards. In a cdma2000-1x-EV-DV compliant CDMA system, the signaling information transmitted in the primary control channel is constrained to be one time slot in duration. However, the signaling information transmitted in the secondary control channel and in the data channel can occupy any number of consecutive time slots. The number of time slots occupied by the data channel and the secondary control channel is indicated in the information being conveyed in the primary control channel.

In accordance with the method of the present invention, the secondary control channel information is scrambled to encode within it the information contained in the primary control channel. No additional channel coding is added to the secondary channel information. The information in the primary control channel sub-packets indicate the length (in terms of number of time slots) of the corresponding sub-packets in the secondary control channels and the corresponding data channels. In particular, sub-packet 102 of the primary control channel contains information indicating that the corresponding secondary control channel information (i.e., sub-packet 112) and the corresponding data channel information (i.e., sub-packet 122) are two time slots in length. In a similar manner sub-packet 104 has information indicating that its corresponding secondary control channel sub-packet 114 and data channel sub-packet 124 each has a length of one time slot. Sub-packet 106 indicates that its corresponding secondary control channel and data channel sub-packets (sub-packets 116 and 126 respectively) have a length of four time slots. Sub-packet 108 has information indicating that its corresponding secondary control channel sub-packet 118 and data channel sub-packet 128 each has a length of two time slots. Sub-packet 110 contains information indicating that its corresponding secondary control channel sub-packet 120 and data channel sub-packet 130 each has a length of one time slot.

In accordance with the method of the present invention, a set of primary control channel information is defined and a particular scrambling procedure of a scrambling scheme is associated to each member of the set. A particular scrambling procedure associated with a particular primary control channel is performed whenever that primary control channel information is to be transmitted. For example, the set of primary control channel information comprises Length=1, Length=2, Length=4, Length=8. One particular scrambling scheme that can be used is the well known technique of interleaving. In interleaving, the time order of a packet of information is altered. The scrambling is performed with an interleaver implemented as a software algorithm or digital hardware or both. The interleaver organizes the information to be scrambled in matrix form. For example a block of information to be scrambled is fragmented into m portions where each portion contains n bits; that is the first portion contains fragment $(a_{11}, a_{12}, a_{13} \ldots a_{1n})$, the second portion contains fragment $(a_{21}, a_{22}, a_{23} \ldots a_{2n})$, the third portion contains fragment $(a_{31}, a_{32}, a_{33} \ldots a_{3n})$ and so on to the $m^{th}$ portion which contains fragment $(a_{m1}, a_{m2}, a_{m3} \ldots a_{mn})$ where $a_{mn}$ is a symbol used to represent information. The indices, m and n are integers equal to 2 or greater. Therefore the matrix is as follows:

$$\begin{bmatrix} a_{11} & a_{12} & \ldots & a_{1n} \\ a_{21} & a_{22} & \ldots & a_{2n} \\ \vdots & \vdots & \ldots & \vdots \\ a_{m1} & a_{m2} & \ldots & a_{mn} \end{bmatrix}$$

One way of interleaving is to sequentially output the information column by column thereby scrambling the original time order of the information. In other words, when the input stream of bits to the interleaver is $(a_{11}, a_{12}, \ldots, a_{1n}, a_{21}, a_{22}, \ldots, a_{2n}, \ldots, a_{m1}, a_{m2}, \ldots, a_{mn})$, the output bit stream is $(a_{11}, a_{21}, \ldots, a_{m1}, a_{12}, a_{22}, \ldots, a_{m2}, \ldots, a_{1n}, a_{2n}, \ldots, a_{mn})$ assuming the first column is outputted first by the interleaver. When the information in the primary control channel is indicating a length of one time slot, the secondary information is interleaved with the first column outputted first followed by the remaining columns. When the information contained in the primary control channel information indicates a length of two time slots, the second column is outputted first followed by the remaining columns with the first column being outputted last. For a length indication of four time slots, the third column is outputted first and for a length indication of eight time slots the fourth column is outputted first. Therefore, each signaling information from the set of defined signaling information is associated with a particular procedure of the scrambling scheme; that is, a particular scrambling procedure is performed for each transmission of a particular signaling information from the defined set. Such scrambling allows the primary control channel information to be encoded into the secondary control information. It will be readily obvious that other lengths can be added to the defined set of primary control channel information and such lengths would be associated with different interleaving procedures as explained above.

When the primary control channel information, the scrambled secondary control channel information and the user information are received, a descrambling operation is performed on the secondary control channel information in accordance with the received primary control channel information and the defined scrambling scheme. For example, if a received primary control channel information indicates a length of two time slots, the receiving equipment will assume that the received secondary channel information was interleaved with the second column being the first column of information to be output by the interleaver. The receiving equipment will descramble the received secondary information accordingly and then decode the information. If the primary control channel contained erroneous information, the decoding operation on the secondary control channel will detect errors because the descrambling operation will not have been the correct one. In other words, regardless of the status of the secondary control channel information, the decoding operation will detect errors if the primary control channel information contained errors.

When the primary control channel information contains errors, the secondary control channel information will not be decoded correctly. The correctly decoded secondary control channel information is thus more reliable allowing the data channel information to be decoded more reliably. It will be readily obvious that other types of interleaving procedures can be used to scramble the secondary control channel information (i.e., more generally, the second signaling channel information) and that the method of the present invention is not at all limited to the particular interleaving procedure described above.

It should be noted that the method of the present invention provides another way of detecting errors in the first signaling channel and a way of determining and confirming that the correct information was transmitted in the first signaling channel. Again suppose the communication system is a cdma2000-1x-EV-DV compliant CDMA system; that is, the first signaling channel is the primary control channel and the second signaling channel is the secondary control channel. Regardless of the status of the information in the secondary control channel, the decoding operation will detect errors if the primary control channel information contained errors. After descrambling the secondary control channel operation, the information received in the secondary control channel and in the data channel are decoded. However, the decoding operation will result in the detection of errors because the primary control channel was in error. In such a case, another scrambling procedure can be applied to the received information and again the received information is decoded; this step is repeated until the results of the decoding operation shows no errors. At that point, it can be deduced that the received primary control channel information is the one that is associated with the scrambling procedure that resulted in an error free decoding operation. In this manner, the primary control channel information (or more generally, the first signaling channel information) can be determined and thus confirmed.

Another scrambling scheme that can be used is the application of orthogonal Walsh codes to the information that is transmitted over the second signaling channel where the particular Walsh code applied is associated with a particular information from the defined set of signaling information transmitted over the first signaling channel. In fact, each signaling information from the defined set of information is associated with a particular Walsh having a specific spreading factor. Continuing with the example described above for a cdma2000-1x-EV-DV compliant CDMA system, if the information transmitted in the primary control channel indicates a sub-packet length of two time slots, the secondary control channel information is scrambled with the use of a Walsh code having a particular spreading factor that causes the secondary channel control information to occupy two time slots. The Walsh code being used is selected from a set of orthogonal Walsh codes having an appropriate spreading factors. Therefore, the particular scrambling procedure is the use of a Walsh code having a particular spreading factor. At the receiving end, the receiver applies the Walsh code associated with a length of two time slots to the received secondary control information because the information received from the primary control channel indicates a length of two time slots. The secondary control information is thus scrambled and it is then decoded over two time slots. The received data channel information is also decoded over two time slots.

Yet, a third scrambling scheme that can be used is the generation of polarized block patterns where each block pattern represent a certain information being transmitted over the first signaling channel. Each information from defined set of information to be transmitted over the first signaling channel is associated with a particular polarized block pattern. A particular polarized block pattern is then transmitted over the second signaling channel based on the information that is transmitted over the first signaling channel. The scrambling procedure creates a polarized block pattern which is generated as follows: the information to be transmitted over the second signaling channel is organized into a block of information; channel coding is applied to the block of information resulting in a coded block of information called a B block; the coded block of information is replicated resulting in a specific number of channel coded blocks; a specific portion of the number of channel coded blocks is then polarized resulting in some of the B blocks becoming −B blocks and the resulting polarized block pattern is associated with a particular information to be transmitted in the first signaling channel. Note that the polarization of an information block B to −B is typically a manipulation of the B block such that the information content remains the same but the actual information symbols used are changed to indicate a change in polarity. For example when the B block is a string of bits, the "1" bits are changed to "0" bits and the "0" bits are changed to "1" bits resulting in a −B block. Again, using the example described above for a cdma2000-1x-EV-DV compliant CDMA system with the defined set of information for the primary control channel being L=1, L=2; L=4 and L=8 a set of polarized block patterns is associated with each L value and the particular set is then transmitted over the secondary control channel. In particular, L=1 is associated with the set {−B }; L=2 is associated with the set {B −B }; L=4 is associated with the set {B B −B −B } and L=8 is associated with the set {B B B B −B −B −B −B}. is generated and then transmitted. In this example, the specific portion that is polarized is half the total number of blocks. At the received end, the receiver will attempt to detect the particular polarized block pattern associated with the received primary control channel information. In particular, if a block receive in slot i $S_i$ then for L=2 the received blocks are combined in the following manner: $S_1-S_2$. For L=4, the received blocks are combined as $S_1+S_2-S_3-S_4$. For L=8, the received blocks are combined as $S_1+S_2+S_3+S_4-S_5-S_6-S_7-S_8$. It can be clearly seen that when L=2 is misinterpreted as L=4 or 8, the received signal will be canceled. Likewise for L=4 misinterpreted as L=8 or L=2 the signal will be canceled. Similarly, for L=8 misinterpreted as L=2 or 4, signal cancellation will occur. For L>1 misinterpreted as any other value for L will result in an invalid information being decoded. For L=1 being misinterpreted as any of the other L values will result in a detection of errors when other signals are present in the ensuing slots.

It will be readily understood that other scrambling schemes can be used in addition to the two schemes described above. Further, the method of the present invention is not at all limited to communication systems having two signaling channels or limited to only wireless communication systems. The method of the present invention is applicable to various types of communication systems having various signaling channel arrangements. Also, the method of the present invention is applicable to forward links transmissions as well as reverse link transmissions. A forward link transmission is when user and/or signaling information are transmitted from system equipment (e.g., base station equipment) to user equipment (e.g., cell phone). A reverse link transmission is when user and/or signaling information are transmitted from user equipment to system equipment.

We claim:
1. A method for transmitting signaling information over control channels of a communication system, the method comprising the steps of:
  providing a defined set of signaling information to be transmitted over a first signaling channel; and
  scrambling signaling information to be transmitted over a second signaling channel based on the particular signaling information, from the defined set, to be transmitted over the first signaling channel.
2. The method of claim 1, further comprising:
  correcting the signaling information transmitted over the first signaling channel and received over such channel without application of additional channel coding to such signaling information.
3. The method of claim 1 where the step of providing a defined set of information further comprises associating a particular scrambling procedure of a particular scrambling scheme to each signaling information in the defined set.
4. The method of claim 3 where the particular scrambling scheme interleaves signaling information to be transmitted over the second signaling channel and the particular scrambling procedure comprises the steps of:
  organizing the second signaling channel information into separate rows of a matrix; and
  outputting columns of the matrix in a sequential manner where the first signaling channel information to be transmitted determines which column of the matrix is outputted first.
5. The method of claim 3 where the particular scrambling scheme applies a particular Walsh code to the signaling information to be transmitted over the second signaling channel and where the applied Walsh code is part of a set of orthogonal Walsh codes having different spreading factors and the particular scrambling procedure comprises the step of selecting a particular Walsh code having an appropriate spreading factor.
6. A method for transmitting signaling information over control channels of a communication system, the method comprising the steps of:
  providing a defined set of signaling information to be transmitted over a first signaling channel where the step of providing a defined set of information further comprises associating a particular scrambling procedure of a particular scrambling scheme to each signaling information in the defined set; and scrambling signaling information to be transmitted over a second signaling channel based on the particular signaling information, from the defined set, to be transmitted over the first signaling channel where the particular scrambling scheme is to generate a polarized block pattern associated with the information to be transmitted over the second signaling channel where the particular scrambling procedure comprises the steps of:

generating a specific number of replicated channel coded blocks; and polarizing a specific portion of the replicated channel coded blocks.

7. The method of claim 6 where the communication system is a cdma 2000-1x-EV-DV standard compliant CDMA system.

8. The method of claim 7 where the first signaling channel is a primary control channel of the CDMA communication system and the second signaling channel is a secondary control channel of the CDMA communication system.

9. The method of claim 8 whore the defined set of information to be transmitted over the primary control channel contains sub-packet length indications for the secondary control channel and a data channel of the CDMA system.

* * * * *